United States Patent
Johnston et al.

(10) Patent No.: US 10,442,707 B1
(45) Date of Patent: Oct. 15, 2019

(54) IN-LINE URINE FILTRATION SYSTEM

(71) Applicants: Samuel Johnston, Edmond, OK (US); Ethan Reed, Edmond, OK (US); Aaron Wuchterl, Edmond, OK (US)

(72) Inventors: Samuel Johnston, Edmond, OK (US); Ethan Reed, Edmond, OK (US); Aaron Wuchterl, Edmond, OK (US)

( * ) Notice: Subject to any disclaimer, the term of this patent is extended or adjusted under 35 U.S.C. 154(b) by 0 days.

(21) Appl. No.: 15/998,061

(22) Filed: Jun. 21, 2018

(51) Int. Cl.
| | |
|---|---|
| C02F 1/32 | (2006.01) |
| E04H 4/16 | (2006.01) |
| C02F 1/44 | (2006.01) |
| C02F 1/70 | (2006.01) |
| E04H 4/12 | (2006.01) |
| C02F 1/52 | (2006.01) |
| C02F 103/42 | (2006.01) |

(52) U.S. Cl.
CPC ............ C02F 1/325 (2013.01); C02F 1/444 (2013.01); C02F 1/70 (2013.01); E04H 4/16 (2013.01); C02F 1/5236 (2013.01); C02F 2103/42 (2013.01); E04H 4/12 (2013.01)

(58) Field of Classification Search
CPC .. C02F 1/325; C02F 1/70; C02F 1/444; C02F 1/5236; C02F 2103/42; E04H 4/16; E04H 4/12
USPC .... 210/167.11, 748.1, 748.11, 615, 620, 632
See application file for complete search history.

(56) References Cited

U.S. PATENT DOCUMENTS

| | | | |
|---|---|---|---|
| 3,261,371 A | 7/1966 | Vernon | |
| 3,310,173 A | 3/1967 | Sosower | |
| 3,465,883 A | 9/1969 | Jumper | |
| 3,493,116 A | 2/1970 | Edmiston | |
| 4,752,401 A * | 6/1988 | Bodenstein | C02F 1/325 134/1 |
| 4,953,561 A | 9/1990 | Guirguls | |
| 5,008,011 A | 4/1991 | Underwood | |
| 5,042,502 A | 8/1991 | Guirguis | |
| 6,569,329 B1 | 5/2003 | Nohren, Jr. | |
| 6,740,066 B2 | 5/2004 | Wolff | |
| 7,169,311 B2 | 1/2007 | Saccomanno | |
| 2010/0270228 A1* | 10/2010 | Teichberg | C02F 1/725 210/281 |
| 2014/0238913 A1* | 8/2014 | Hoang | E04H 4/1209 210/167.12 |
| 2016/0167974 A1* | 6/2016 | Novek | C07C 273/04 429/50 |
| 2016/0362322 A1* | 12/2016 | Kuo | A01K 63/00 |

* cited by examiner

*Primary Examiner* — Fred Prince
(74) *Attorney, Agent, or Firm* — Randal D. Homburg

(57) ABSTRACT

A biological filtration system for the neutralization of urine and other pool biologicals within a water filtration system of a pool or spa, providing for the neutralization of urine, bacteria, viruses and other biologicals, using a UVC lamp, a urease reaction chamber, a nitrifying bacteria reaction chamber and a nitrate filter prior to return to the water inlet supply line of the pool or spa.

5 Claims, 6 Drawing Sheets

US 10,442,707 B1

IN-LINE URINE FILTRATION SYSTEM

CROSS REFERENCE TO RELATED APPLICATIONS

None.

I. BACKGROUND OF THE INVENTION

1. Field of Invention

A biological filtration system for the neutralization of urine and other pool biologicals within a water filtration system of a pool or spa, providing for the neutralization of urine, bacteria, viruses and other biologicals, using a UVC lamp, a urease reaction chamber, a nitrifying bacteria reaction chamber and a nitrate filter prior to return to the water inlet supply line of the pool or spa.

2. Description of Prior Art

A preliminary review of prior art patents was conducted by the applicant which reveal prior art patents in a similar field or having similar use. However, the prior art inventions do not disclose the same or similar elements as the present filtration system, nor do they present the material components in a manner contemplated or anticipated in the prior art.

Water filters for pools are indicated in several patents. These type filters are shown in U.S. Pat. No. 3,261,371 to Vernon (geological pool filter), U.S. Pat. No. 3,493,116 to Edmiston (sedimentary filter) and U.S. Pat. No. 3,310,173 to Sosower (sediment removal filter). Other water and sanitizing filters are demonstrated. An in-line chlorine filter is shown in U.S. Pat. No. 5,008,011 to Underwood. A UV light sanitizer is shown within a clear tube which passes water to disinfect the water as it passes the light. A bottlecap filter is shown in U.S. Pat. No. 6,569,329 to Nohren, Jr., which filters water prior to allowing it to enter a water bottle to eliminate chlorine or biologicals as well as to add flavorings. A fuel filter is shown in U.S. Pat. No. 3,465,883 to Jumper to remove water from fuel. Thus, filtering water is known and important.

None of the prior art utilizes the combination of filtration which include the treatment of water by UVC light, provide a urease mixing chamber, further provide a nitrifying bacterial mixing chamber and a final nitrate filter to remove and/or neutralize all the element contaminants found in pool and spa water.

II. SUMMARY OF THE INVENTION

Typical water filtration systems for pools and spas is generally provided by a water circulation system incorporated within the pool or spa that circulates the water and provides for a chemical means of sanitizing the water during circulation using solid or gaseous chlorine, soda ash, or some type of salt. Most often, these chemicals are intended to neutralize bacteria, but not necessarily designed to remove biologicals and organic materials which are contained within the water supply introduced by human or animal occupants, including body secretions and emissions. An improved pool and spa filtration and neutralization system which would more efficiently eliminate these biologicals may be desired over the current pool and spa filtration systems.

The purpose of the present system is to provide a four stage filtration system contained within a single circulation system for replacement of the less efficient circulation systems would include the four stage filtration system as disclosed in the present in-line filtration system which provides a UVC light to eliminate living organisms and viruses, a urease mixing chamber providing urease to neutralize urea, a major component of urine breaking down the urea into carbon dioxide and ammonia, a nitrifying bacteria mixing chamber to convert ammonia to nitrate and carbon dioxide and a final nitrate filter to remove and/or neutralize the nitrates using an ion exchange, continuously eliminating the elements and urine based contaminants found in pool and spa water.

III. DESCRIPTION OF THE DRAWINGS

The following drawings are submitted with this utility patent application.

IV. DESCRIPTION OF THE PREFERRED EMBODIMENT

Figure 1:
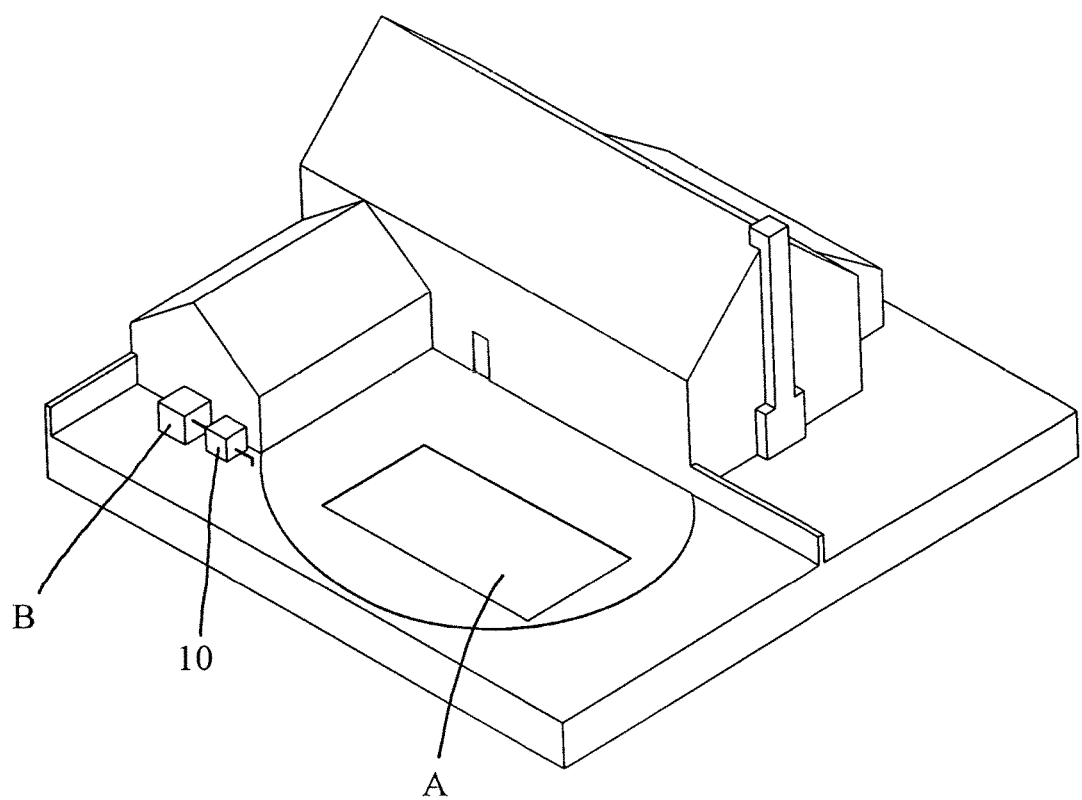
FIG. 1 is a diagram of a residential pool with the present biological filtration system installed within the water circulating system.

A pool and spa biological filtration system 10, shown in FIGS. 1-6 of the drawings, is installed within a new or an existing pool A or spa water circulation system B, the biological filtration system 10 comprising a water inlet pipe 12 receiving circulated water from the water circulating system B, a UVC light tube component 20, a urease reaction component 40, a nitrifying bacteria component 60, a nitrate filtration cylinder 80 containing a replaceable nitrate filter cartridge 90 an outlet tube 84 returning sanitized water into the water circulating system B.

Figure 2:
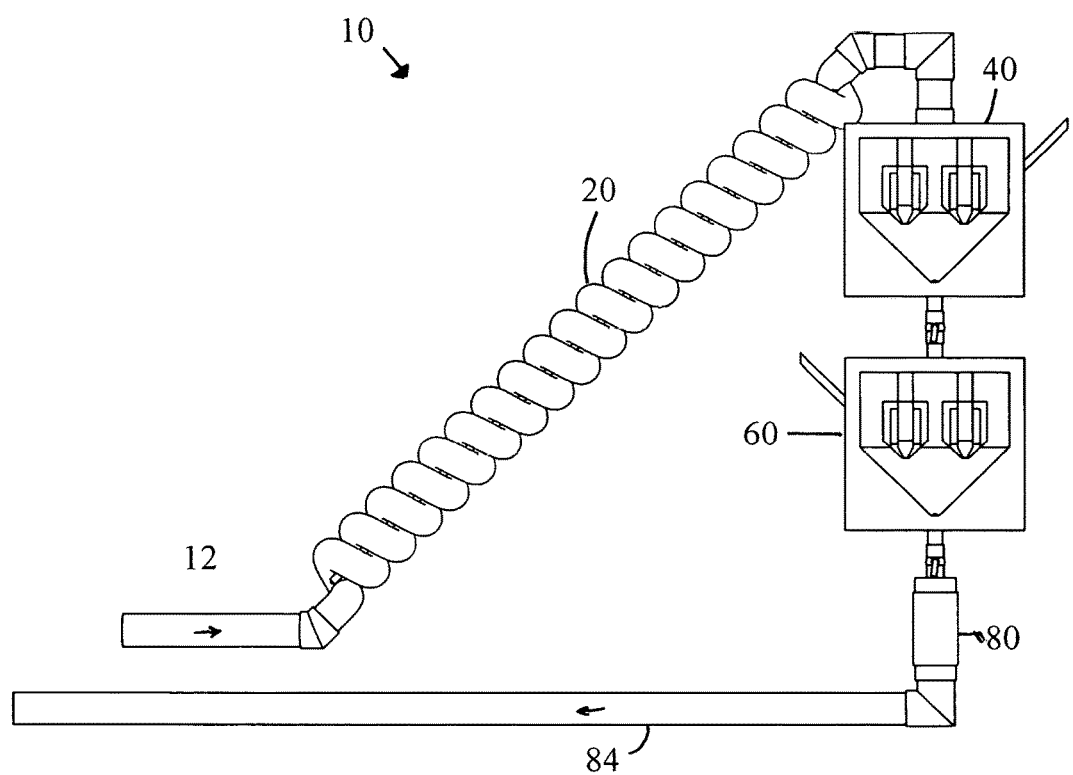
FIG. 2 is a diagram of the biological filtration system.
Figure 3:
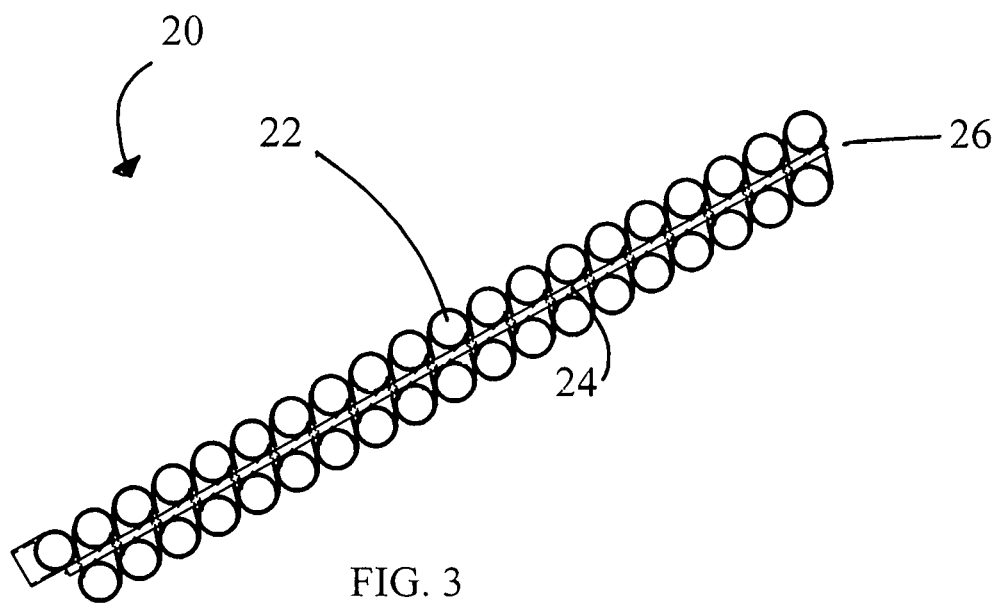
FIG. 3 is a cross sectional diagram of the UVC light tube component.

The UVC light tube component 20, FIGS. 2-3, further comprises a spiral clear water tube 22 which forms a helix surrounding a UVC light 24, the UVC light illuminating the water flowing through the clear water tube to eliminate live bacteria and viruses which may be contained within the circulating water, with an outlet tube 26 eliminating the water from the UVC light tube component 20. The UVC light tube 20 components would attach to a local electrical power supply and would be best suited by location as the first component of the biological filtration system to eliminate those live particles within the circulating water for subsequent filtration and removal.

The second preferable sequential segment of the biological filtration system 10 is the urease reaction component 40. This component provides a first mixing chamber 42, FIG. 4, comprising a water inlet line 43, a mixing cavity 44 defining a lower tapered floor 45, one or more impellers 46 which provide a turbulence within the mixing cavity 44 as water flows through the first mixing chamber 42, a water outlet line 47 and a chemical input tube 48 which provides a passage from the outside of the first mixing chamber 42 into the mixing cavity 44 to introduce a urease reaction catalyst. The purpose of the urease reaction component 40 is to neutralize urea contained in pool or spa water, generally found in urine introduced into the pool by occupants as well as produced by bacteria, fungi, algae, plants and other animal organisms. The urease is the enzyme catalysts which convert the urea into carbon dioxide and ammonia. Therefore urease containing products are those which are introduced into the first mixing chamber 42 to convert the urea found in the urine and other biological byproducts and convert the urea into harmless carbon dioxide and ammonia, which is dissipated and send on into the rest of the biological filtration system 10. The first mixing chamber 42 also provides a valve 49 in the outlet line 47 to eliminate water flow from the first mixing chamber 40 during a cleaning or backwash process.

Figure 4:
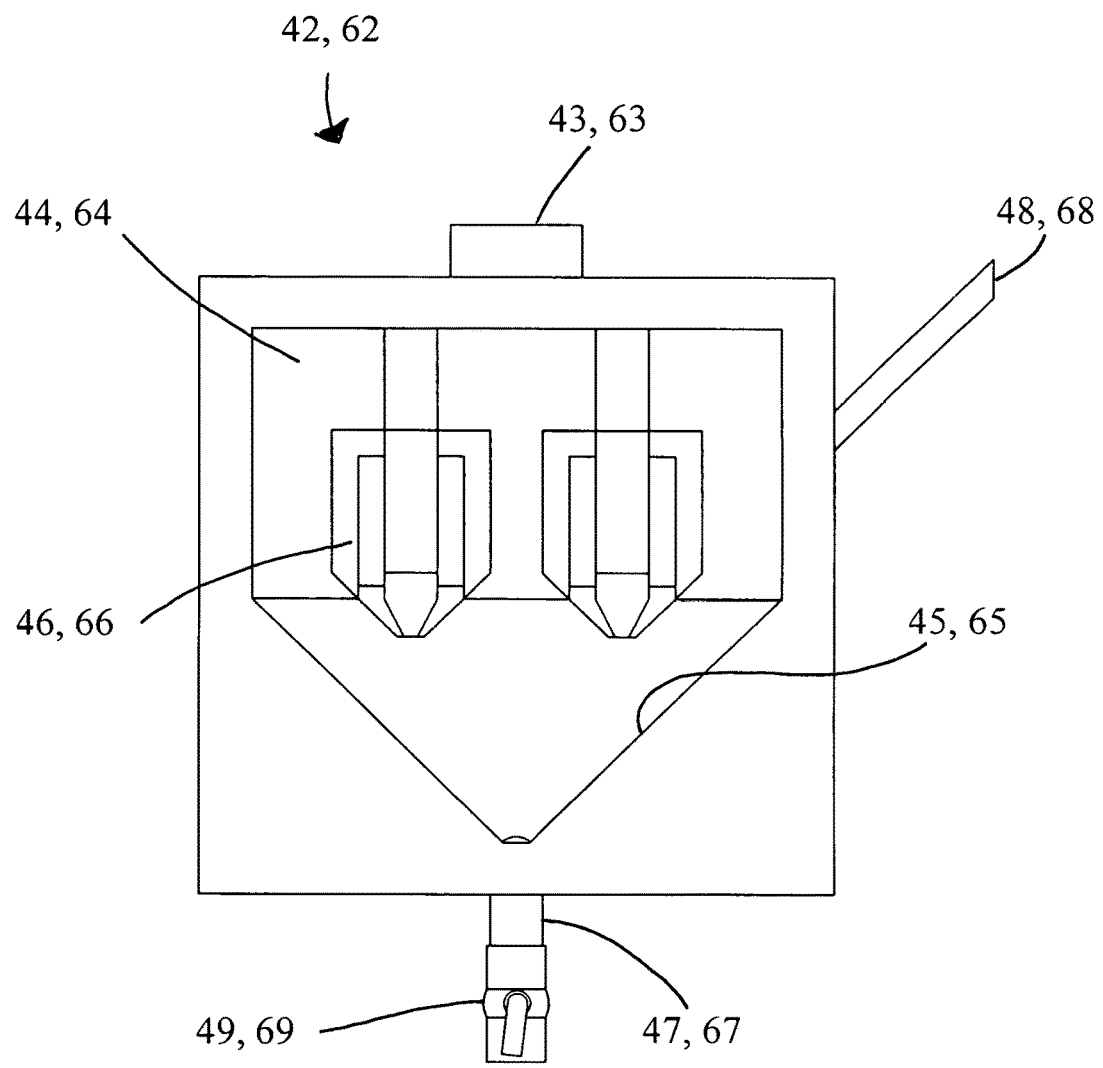
FIG. 4 is a cross sectional view of the mixing chamber for the urease and nitrifying bacterial components.

The third preferred sequential segment of the biological filtration system 10 is the nitrifying bacteria chamber 60, which provides a second mixing chamber 62, FIG. 4, comprising a water inlet line 63, a mixing cavity 64 defining a lower tapered floor 65, one or more impellers 66 which provide a turbulence within the mixing cavity 64 as water flows through the second mixing chamber 62, a water outlet line 67 and a chemical input tube 68 which provides a passage from the outside of the second mixing chamber 62 to the mixing cavity 64 to introduce a nitrifying bacteria product. The purpose of the nitrifying bacteria chamber 60 is to covert ammonia into nitrates contained in the pool or spa water, which are byproducts of the previous urease reaction and also which are also present in water supplies that are from ground water as opposed to municipal treated water supplies. Use of dried nitrifying bacteria to conduct this conversion products is one means of establishing the nitrification process, but also can be assisted by the use of oxidizers, which tend to be higher pH compounds that are otherwise safe for water which is occupied by humans or other chemicals which are known to transfer electrons from nitrogen atoms to oxygen atoms. The second mixing chamber 62 also provides a valve 69 in the outlet line 67 to eliminate water flow from the second mixing chamber 62 during a cleaning or backwash process or when the nitrate filter chamber 80 is opened to exchange the expended nitrate filter sponge 90.

Figure 5:
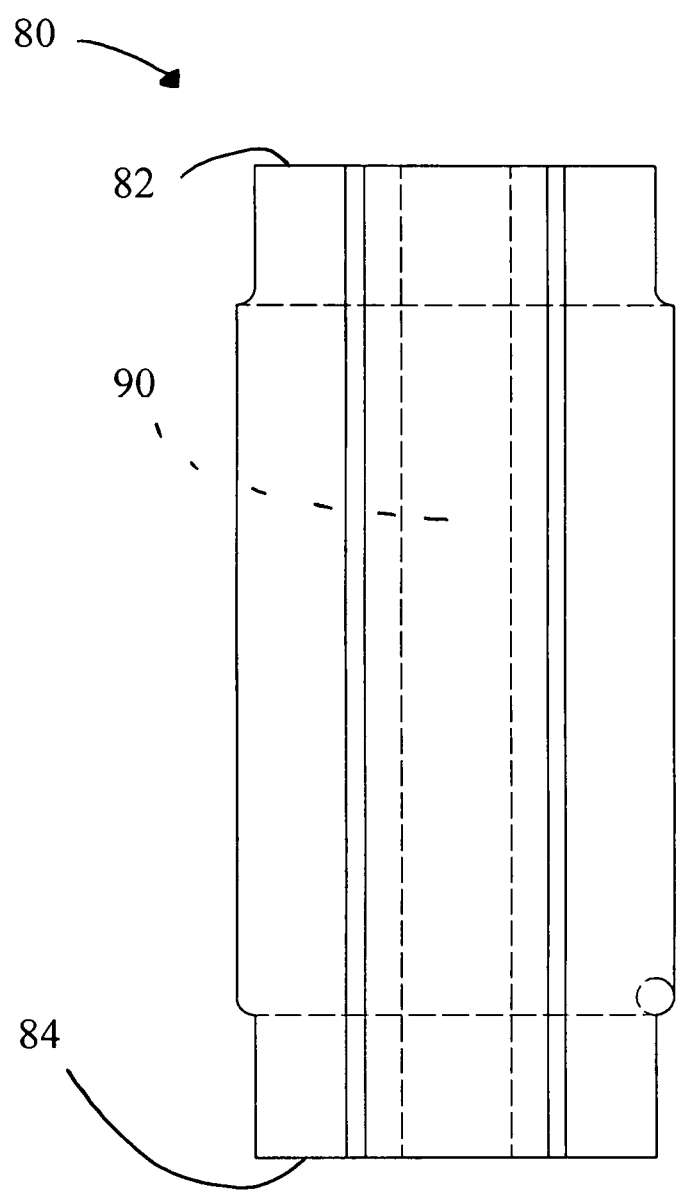
FIG. 5 is an outer view of the nitrate filtration cylinder.
Figure 6:
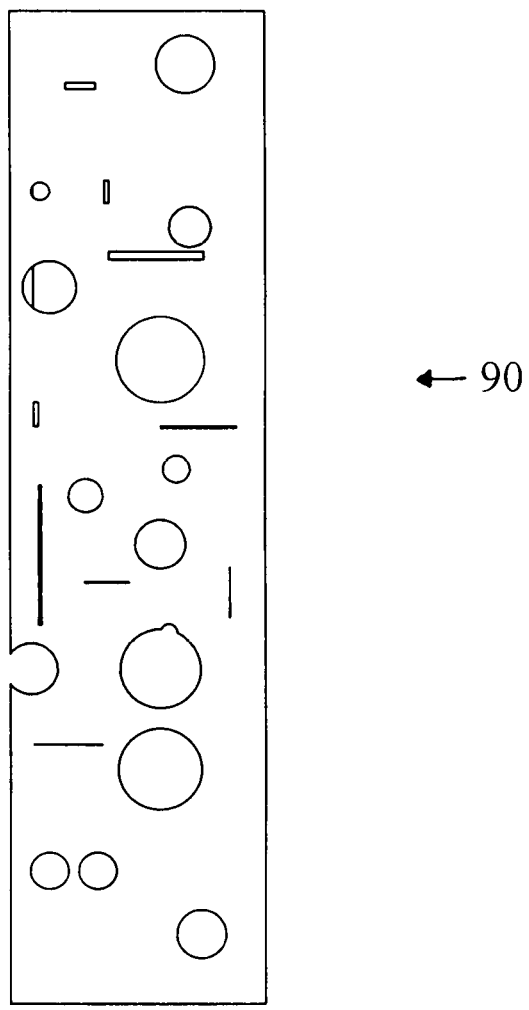
FIG. 6 is a cross-sectional view of the replaceable nitrate filter cartridge.

The final or fourth preferred sequential segment of the biological filtration system 10 is the nitrate filter chamber 80, FIGS. 5-6, containing the nitrate filter sponge 90. This nitrate filter chamber 80 defines an inlet line 82, an outlet line 84, and an optional sealed chamber door which may be opened or closed to access and secure the nitrate filter sponge 90 within. The nitrate filter sponge 90 is preferably cylindrical and can be provided as a porous sponge, fiber or polymeric matrix which can be embedded with a salt. Nitrates can be dangerous and need to be removed, mostly generated by the above noted reactions. High nitrates can be health hazardous. The removal occurs by the exposure of the nitrates to harmless salts, which include sodium chloride, or table salt, potassium chloride or sea salts, bromide salts, and other non-toxic salts which neutralize and eliminate nitrates from the flowing circulated water prior to return. The nitrate filter cartridges 90, after some use, will discharge their embedded salts and also likely become clogged due to some particulate filtration which occurs as the water passes through it over time. Therefore, periodic exchange of a spent nitrate filter sponge 90 is required to maintain fresh nitrate reducing salts in conducting the nitrate removal.

The above disclosed biological filtration system 10 is suggested for use in pools and spas either as the primary pool filtration system, which would require the use of a particle filter prior to the suggested components, the UVC light tube component 20, to eliminate gross particles, or as a secondary pool filtrations system, subsequent in line to the primary and existing pool filtration system B. In any event, the biological filtration system 10 can be an original installation or an after market installation.

While the biological filtration system 10 has been particularly shown and described with reference to a preferred embodiment thereof, it will be understood by those skilled in the art that changes in form and detail may be made therein without departing from the spirit and scope of the invention.

What is claimed is:

1. A pool and spa biological filtration system installed within a new or an existing pool or spa water circulation system, the biological filtration system comprising:
    a water inlet pipe receiving circulated water from the water circulating system;
    a UVC light tube component attaching to said water inlet pipe exposing said circulated water to a UVC light tube and an outlet tube;
    a urease reaction component connected to said outlet tube of said UVC light tube component to introduce a urease reaction catalyst to said circulating water to neutralize urea contained in said pool or spa water;
    a nitrifying bacteria component attaching to an outlet pipe from said urease reaction component to introduce a nitrifying bacteria product to said circulating water;
    a nitrate filtration chamber attached to an outlet pipe from said nitrifying bacteria component, said nitrate filtration chamber containing a replaceable nitrate filter cartridge; and
    an outlet tube attaching to said nitrate filtration chamber returning sanitized water into said water circulating system.

2. The pool and spa biological filtration system of claim 1, said UVC light tube component further comprising:
    a spiral clear water tube forming a helix surrounding said UVC light tube, said UVC light tube illuminating the water flowing through said clear water tube to eliminate live bacteria and viruses which may be contained within said circulating water, said UVC light tube component being a first component of the biological filtration system to eliminate live particles within said circulating water for subsequent filtration and removal.

3. The pool and spa biological filtration system of claim 1, said urease reaction component further comprising:
    a first mixing chamber comprising a water inlet line, a mixing cavity defining a lower tapered floor, one or more impellers which providing a turbulence within said mixing cavity as water flows through said first mixing chamber, a water outlet line and a chemical input tube providing a passage from outside said first mixing chamber into said mixing cavity to introduce said urease reaction catalyst into said first mixing chamber, wherein the primary purpose of said urease reaction component is to neutralize urea contained in pool or spa water, generally found in urine introduced into said pool by occupants as well as produced by bacteria, fungi, algae, plants and other animal organisms, said urease defining an enzyme catalyst which converts urea into carbon dioxide and ammonia.

4. The pool and spa biological filtration system of claim 1, said nitrifying bacteria component further comprising:
    a second mixing chamber comprising a water inlet line, a mixing cavity defining a lower tapered floor, one or more impellers which providing a turbulence within said mixing cavity as water flows through said second mixing chamber, a water outlet line and a chemical input tube which provides a passage from the outside said second mixing chamber to said mixing cavity to introduce a nitrifying bacteria product, wherein the purpose of said nitrifying bacteria component is to covert ammonia into nitrates contained in said pool or spa water, which are byproducts of the previous urease reaction and also which are also present in water supplies that are from ground water as opposed to municipal treated water supplies, primarily using dried nitrifying bacteria to conduct conversion products as a means of establishing a nitrification process, also assisted using oxidizers, which tend to be higher pH compounds that are otherwise safe for water which is occupied by humans or other chemicals which are known to transfer electrons from nitrogen atoms to oxygen atoms.

5. The pool and spa biological filtration system of claim 1, said further comprising:

said nitrate filtration chamber defining an inlet line and an outlet line; and a nitrate filter sponge is cylindrical and provided as a porous sponge or a fibrous polymeric matrix which is embedded with a harmless nitrate reducing salt, wherein nitrates, being dangerous and in need of removal from human exposure to prevent health hazards, with removal occurring by exposing said nitrates to said harmless nitrate reducing salts, said harmless nitrate reducing salts selected from a list including sodium chloride or table salt, potassium chloride or sea salts, bromide salts, and other non-toxic salts which neutralize and eliminate said nitrates from said circulating water prior to return to said pool with said nitrate filter sponges, after some use, discharging said embedded nitrate reducing salts and also becoming clogged due to some particulate filtration occurring as said circulating water passes over time, thereby requiring periodic exchange of said discharged nitrate filter sponge required to maintain fresh nitrate reducing salts in conducting said nitrate removal.

\* \* \* \* \*